United States Patent [19]

Parikh

[11] Patent Number: 4,551,836
[45] Date of Patent: Nov. 5, 1985

[54] CROSS-COPY ARRANGEMENT FOR SYNCHRONIZING ERROR DETECTION CLOCK SIGNALS IN A DUPLEX DIGITAL SYSTEM

[75] Inventor: Kamal I. Parikh, Phoenix, Ariz.

[73] Assignee: GTE Automatic Electric Incorporated, Northlake, Ill.

[21] Appl. No.: 506,567

[22] Filed: Jun. 22, 1983

[51] Int. Cl.⁴ .............................................. G06F 9/00
[52] U.S. Cl. ........................................ 371/1; 371/47; 307/269; 364/900
[58] Field of Search ............... 371/61, 1, 47; 375/106, 375/110, 118; 307/269; 360/32, 51; 364/200, 900; 368/52, 56, 217

[56] References Cited

U.S. PATENT DOCUMENTS

| | | | |
|---|---|---|---|
| 3,970,995 | 7/1976 | Baudouin | 364/900 |
| 4,128,881 | 12/1978 | Yamamoto et al. | 364/200 |
| 4,218,770 | 8/1980 | Weller | 371/61 |
| 4,295,220 | 10/1981 | Blum et al. | 371/61 |
| 4,381,525 | 4/1983 | Senoo et al. | 360/32 |
| 4,419,739 | 12/1983 | Blum | 371/61 |
| 4,425,645 | 1/1984 | Weaver et al. | 375/106 |

Primary Examiner—Michael R. Fleming
Attorney, Agent, or Firm—Anthony miologos; Peter Xiarhos

[57] ABSTRACT

A cross-copy arrangement is shown for synchronizing parity clock signals in a duplex digital system. Each copy of the duplex system generates a local timing signal and a remote timing signal. The remote signal of each copy is crossed over and logically combined with the local timing signal generating a parity clock signal.

3 Claims, 3 Drawing Figures

CROSS-COPY ARRANGEMENT FOR SYNCHRONIZING ERROR DETECTION CLOCK SIGNALS IN A DUPLEX DIGITAL SYSTEM

BACKGROUND OF THE INVENTION

This invention relates in general to duplex digital systems and more particularly to a cross-copy arrangement for synchronizing parity clock signals between the active and standby copies of a duplex digital system.

A typical duplex system employs duplicated peripheral processors containing identical data and operating synchronously to control a simplex or an individual controlled stage. One of the peripheral processors is normally used as the active copy while the other is left in a standby status. Since both copies contain identical information and are running synchronously the standby copy may be brought on line replacing the active copy in the event the active copy processor fails.

Therefore, in response to read or write commands from each processor the controlled stage transmits information simultaneously to both stages.

It is not uncommon in such systems that timing skew between the two copies of the system allows one copy to run faster than the other. If the timing skew causes the standby copy to run faster than the active copy, returned data information to the active copy from the controlled stage can cause a false error signal. The returned data information normally includes a parity bit, which, because of the timing skew would be clocked too soon in the standby copy than in the active copy generating a false parity failure.

Therefore, the present invention synchronizes the parity clock signal between the active and standby copies of a duplex digital system preventing false parity failures.

SUMMARY OF THE INVENTION

The present invention is a cross-copy arrangement for producing first and second synchronized output clock signals in a duplex digital system having first and second peripheral processors. Each processor is connected to a common controlled stage via a control and data interface. Both processors process the same information allowing the controlled stage to select one as the active and the other as a standby. The digital system includes a network clock unit transmitting a master-clock signal to all elements of the system.

The present invention includes a first timing generating means associated with the first peripheral processor receiving the master-clock signal and developing a local timing signal and a remote timing signal. First gating means associated with the first timing generating means receives the local timing signal.

Second timing generating means associated with the second peripheral processor receives the master-clock signal and develops a local timing signal and a remote timing signal. The remote timing signal developed by the second timing generating means is also applied to the first gating means and responsive to the latest signal received the first gating means develops and transmits the first output clock signal.

Second gating means associated with the second timing generating means receives the local timing signal and the first timing generating means remote timing signal and responsive to the latest signal received, the second gating means transmits the second output clock signal.

Therefore, the output clock signals from the first gating means and the second gating means are synchronized to each other and occur simultaneously.

DESCRIPTION OF THE PREFERRED EMBODIMENT

Figure 1:
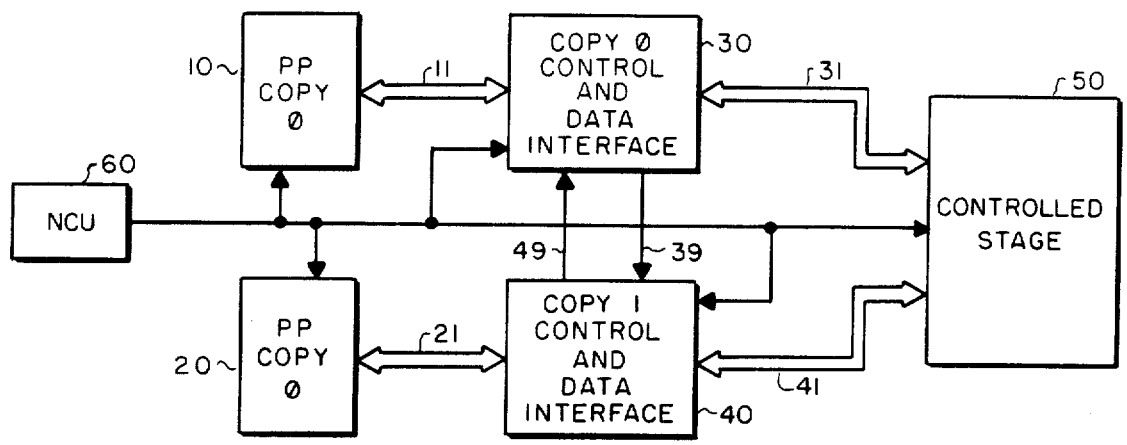
FIG. 1 is a block diagram illustrating a duplex digital system having dual copy peripheral processors controlling a single stage.

Turning now to FIG. 1, a block diagram of a digital system having duplicated peripheral processors is illustrated. As can be seen a controlled stage 50 has access via bi-directional bus 31 to a copy 0 control and data interface 30 and via a second bi-directional bus 41 to an identical copy 1 control and data interface 40. Each bus 31 and 41 includes control, address and data lines. Copy 0 control and data interface 30 is connected via bi-directional bus 11 to a copy 0 peripheral processor 10. Likewise, copy 1 control and data interface 40 is connected to a copy 1 peripheral processor 20 via a bi-directional bus 21. Each bus 11 and 21 includes control, address and data lines. A network clock unit 60 develops a master-clock signal which it applies to all the stages of the digital system.

Normally, in duplex systems of this type copy 0 and copy 1 run synchronously with one copy being the active copy and the other in a standby status. Since both processors contain identical control information the standby copy can be selected by the controlled stage 50 if the active copy fails.

Therefore, a read control command sent from the copy 0 control and data interface 30 to the controlled stage 50 and simultaneously from the copy 1 control and data interface 40, to the controlled stage 50 within a perfect timing relationship, would be received at approximately the same time. The controlled stage 50 would then select the active copy and send the control data information to the interfaces and on to the respective peripheral processors.

Figure 3:
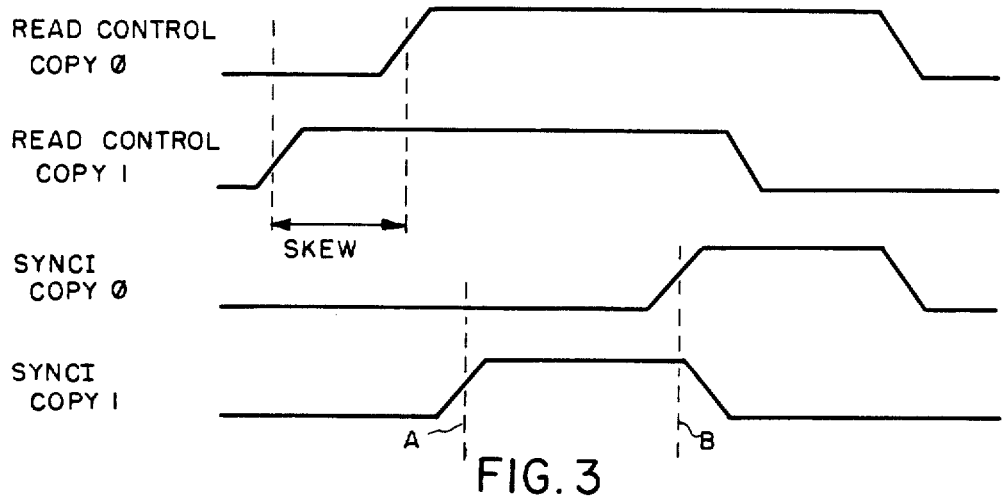
FIG. 3 is a timing diagram showing the timing relationships between the first and second copy when timing skew is introduced.

Inter-module skew which can develop in systems receiving a master-clock signal in different modules can delay the read control signal sent by each copy to the controlled stage. This delay will cause the returned data from the controlled stage to each periphral processor to be later than the other as can be seen in FIG. 3. If the standby copy is the latter of the two read control signals, no consequences occur. But, if the standby copy control signals arrive before the active copy, a false alarm condition could occur.

Since the controlled stage 50 sends data information back to each peripheral processor on a read control signal, the data information normally includes a parity bit. When the standby copy (copy 1) is running faster than the active copy (copy 0), a false parity bit may be clocked by the active control and data interface setting an alarm condition.

Therefore, the present invention provides a cross-copy arrangement for synchronizing clock signals between the copy 0 control and data interface 30 and the copy 1 control and data interface 40 in order to prevent false parity bit failures.

Figure 2:
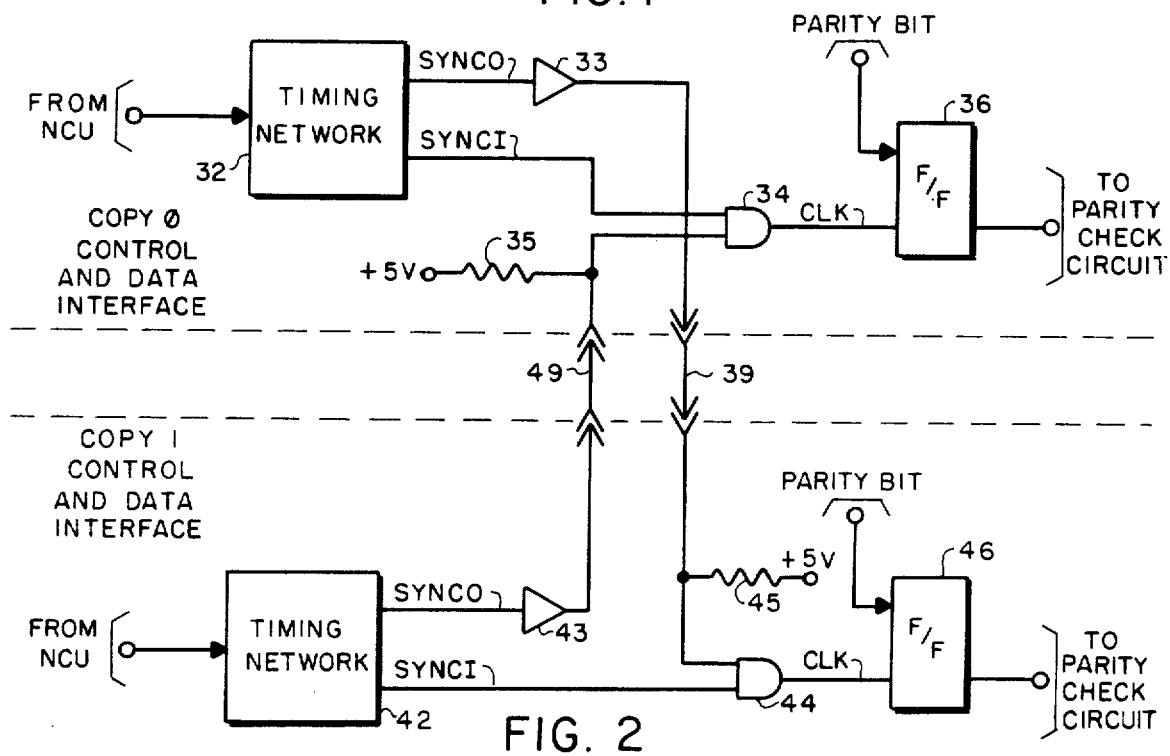
FIG. 2 is a schematic representation of the cross-copy arrangement of the present invention.

Turning now to FIG. 2, the arrangement of the present invention is illustrated. In copy 0 control and data interface 30 a timing network 32 which receives the master-clock signal from the network clock unit 60 develops a SYNCO and a SYNCI output signal. The SYNCO signal is applied to AND gate 44 of the copy 1 control and data interface via line 39 and line driver 33. Likewise, in copy 1, a timing network 42 develops a SYNCO and a SYNCI signal with the SYNCO signal applied to copy 0 AND gate 34 via line 49 and line driver 43.

The SYNCO signal sent to each stage is combined with each copy's SYNCI signal at gates 34 and 44, providing the clock (CLK) signal for parity flip-flop 36 in copy 0 and parity flip-flop in copy 1. The CLK signal is used to clock in the parity bit of the control information transmitted to the peripheral processors. The outputs of flip-flops 36 and 46 are connected to parity checking circuitry to ascertain with the correct parity has been received.

With renewed reference to FIG. 3 as well as FIG. 2, in the digital system illustrated, copy 0 is the active copy and copy 1 is the standby copy a timing skew allowing copy 1 to run faster than copy 0 would allow the SYNCI signal of copy 1 (A) to clock the read data parity from the control stage before copy 0 (B). The present invention provides the clock to parity flip-flops 36 and 46 to occur only until the latter of the two received SYNC sigals. Therefore, if copy 1 is running faster than copy 0, copy 1's SYNCO output would not be gated through gate 34 until the SYNCI output occurs at copy 0. Thereby, both CLK signals are transmitted synchronously at the rising edge of the latest SYNC signal received from either copy.

Resistors 35 on copy 0 and 45 of copy 1 provide for a hardwired positive logic signal for SYNCO in cases where either copy control and data interface is missing from the system.

Although the best mode is contemplated for carrying out the present invention has been herein shown and described, it will be apparent that modification and variation may be made without departing from what is regarded as the subject matter of the invention.

What is claimed is:

1. A cross-copy arrangement producing first and second synchronized output clock signals in a digital system having first and second peripheral processors, said system including a network clock unit transmitting a master-clock signal, said cross-copy arrangement comprising:

first timing generating means associated with said first peripheral processor, said first timing generating means receiving said master-clock signal and developing a first local timing signal and a first remote timing signal;

first gating means associated with said first timing generating means receiving said first local timing signal;

second timing generating means associated with said second peripheral processor, said second timing generating means receiving said master-clock signal and developing a second local timing signal and a second remote timing signal, and said first gating means further receiving said second timing generating means second remote timing signal and responsive to the concurrent presence of both said first local timing signal and said second remote timing signal said first gating means develops said first output clock signal; and second gating means associated with said second timing generating means receiving said second local timing signal, and said second gating means further receiving said first timing generating means first remote timing signal and responsive to the concurrent presence of both said second local timing signal and said first remote timing signal said second gating means develops said second output clock signal.

2. The cross-copy arrangement as claimed in claim 1, wherein: said first gating means is an AND gate having a first input receiving said first timing generating means first local timing signal and a second input receiving said second timing generating means second remote timing signal and responsive to the latest signal received said AND gate output transmits said first output clock signal.

3. The cross-copy arrangement as claimed in claim 1, wherein: said second gating means is an AND gate having a first input receiving said second timing generating means second local timing signal and a second input receiving said first timing generating means first remote timing signal and responsive to the latest signal received, said AND gate output transmits said second output clock signal.

* * * * *